United States Patent [19]
Henry

[11] 3,858,172
[45] Dec. 31, 1974

[54] ALTITUDE DETECTING INSTRUMENT

[76] Inventor: Richard D. Henry, Hookstown Grade Rd., R.D. No. 1, Clinton, Pa. 15026

[22] Filed: Mar. 5, 1973

[21] Appl. No.: 337,928

[52] U.S. Cl............................. 340/27 NA, 73/386
[51] Int. Cl............................................. G08g 5/02
[58] Field of Search.......... 73/384, 385, 178 R, 386; 340/25, 27 R, 27 AT, 27 NA

[56] References Cited
UNITED STATES PATENTS
2,112,253 3/1938 Smith.............................. 340/27 R
2,468,945 5/1949 Sasser............................ 340/27 NA
2,735,081 2/1956 Hosford........................ 340/27 NA Primary Examiner—Kathleen H. Claffy
Assistant Examiner—Randall P. Myers
Attorney, Agent, or Firm—John A. Young

[57] ABSTRACT

An instrument for detecting and signalling altitudes, of aircrafts, especially certain significant altitudes, in which a barometric unit is provided and which is arranged in controlling relation to an electric circuit which contains both visible and audible signalling devices. The instrument, is adjustable to vary the particular altitude at which the signalling devices incorporated in the electric circuit are actuated and to adjust the instrument for various barometric conditions.

25 Claims, 16 Drawing Figures

ALTITUDE DETECTING INSTRUMENT

The present invention relates to instruments, especially useful in connection with aircraft, and is particularly concerned with an instrument which will detect certain altitude attained by the aircraft and actuate a signal.

In the operation of aircraft certain altitudes are critical. In one instance, the aircraft pilot relies on the altimeter in the aircraft to determine his altitude with the altimeter being corrected for local barometric conditions up to 17,500 feet. Above 17,500 feet the altimeter operates in uncorrected mode and it is, accordingly, extremely important for the pilot of an aircraft to know when the plane passes through 17,500 feet so that suitable adjustments can be made in the altimeter. When descending, upon passing through 17,500 feet, the pilot is required to adjust the altimeter in conformity with local barometric pressure and if this is not done, the plane can be several hundred, even thousands of feet off the prescribed level and which would, of course, create a most dangerous situation. Furthermore, the actual height of the aircraft from gound level cannot be ascertained unless the altimeter of the aircraft is adjusted for local barometric pressure.

Similarly, when the plane is ascending and passes through 17,500 feet, the pilot is required to return his altimeter to standard barometric pressure, namely, 29.92 inches of mercury, and if this is not done a false indication of the level at which the plane is flying can be indicated by the altimeter.

In still another case, when the aircraft is approaching a landing strip it is extremely important for the pilot to be alerted at a certain height above the landing strip and, for this purpose, the instrument according to the present invention is adjustable to signal the pilot when a certain predetermined lower level of flight is attained by the aircraft during the approach to a landing site.

The need for systems of the nature referred to are apparent to those familiar with the art of instrument flying. The systems which are in common use today are helpful but are quite inadequate in respect of certain extremely important areas.

An ideal instrument for descent altitude signalling is an instrument which the pilot can correct for the local barometric pressure, corrected to sea level for the airport which the piloted plane is approaching, and which could then be adjusted to set the altitude to which he desires to descend. Upon reaching this altitude, a signal would be given whereupon the pilot could adjust the altitude scale for, say, another 20 to 50 feet lower and continue to fly at the higher altitude until descending further, whereupon another signal would be given.

With a minimum altitude set into the instrument, the instrument will signal if the pilot goes below this altitude whereby the plane can readily be maintained at the minimum safe altitude until it is certain that the landing conditions are safe.

The instrument arrangement for indicating the altitude at which the pilot is required to change over his altimeter from corrected mode to standard mode has obvious merit and is preferably so constructed as to signal the pilot in each of the ascending and descending directions of travel through the critical altitude of 17,500 feet.

With the foregoing in mind, an object of the present invention is the provision of instrumentation for aircraft of the nature referred to above.

A particular object of the present invention is the provision of instrumentation for aircraft which will alert a pilot to at least one critical altitude so that adjustments in other instruments, for example, the altimeter can be made.

Another object of the present invention is the provision of an instrument for an aircraft which will alert a pilot to the plane having reached a certain desired minimum altitude during an approach to a landing site.

Still another object is the provision of an instrument for alerting the pilot to the altitude at which the altimeter of the aircraft is to be adjusted between corrected mode and standard mode.

A still further object is the provision of an instrument of the nature referred to which is extremely reliable in operation.

Still another object is the provision of an instrument of the nature referred to which is fully adjustable and which is highly accurate.

The foregoing objects as well as still other objects and advantages of the present invention will become more apparent upon reference to the following detailed description taken in connection with the accompanying drawings in which.

BRIEF SUMMARY OF THE INVENTION

According to the present invention, a barometric element is provided which expands and contracts in conformity with the changes in the barometric pressure ambient thereto. Associated with the barometric element is a current control device, which may be in the form of a limit switch, or which may consist of contacts actuated by the barometric element, either directly or through a lever system.

The current control device is embodied in an electric circuit which includes a source of electric power and electrically operated visible and audible signalling devices. The instrument is provided with a manual switch so that the pilot, once alerted, can actuate the switch thereby to turn off at least the audible signalling device. The barometric element actuates the current controlling device in response to reduction in barometric pressure, or to an increase therein.

Preferably, when the manual switch is actuated to turn off at least the audible device, a change in the current controlling device as indicated by the barometric element indicating that the plane has returned to an altitude which prevailed prior to the actuation of the audible device, will again cause the audible device to be sounded. Thus, when passing through a critical altitude in one direction the audible device will sound, and upon operating the manual switch to turn off the audible device, the audible device will again be sounded when the plane passes through the same critical altitude going in the opposite direction.

DETAILED DESCRIPTION OF THE INVENTION

Figure 1:
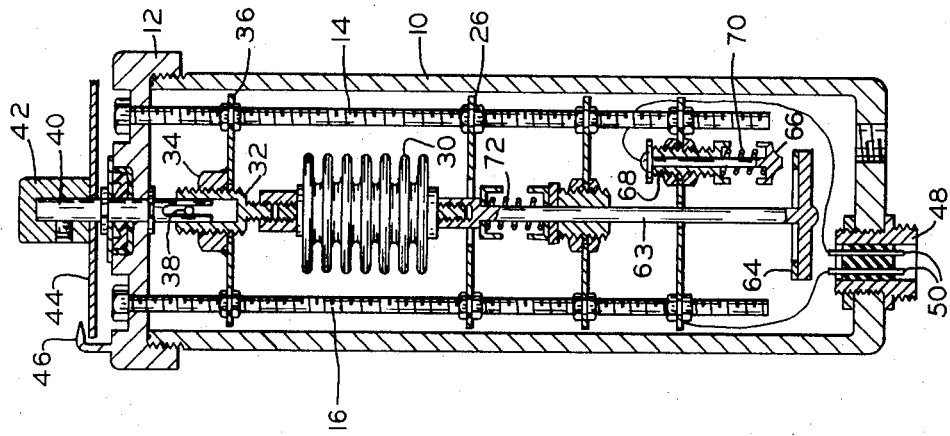
FIG. 1 is a sectional view through an instrument constructed in accordance with the present invention in which the barometric element of the instrument actuates a limit switch.
Figure 4:
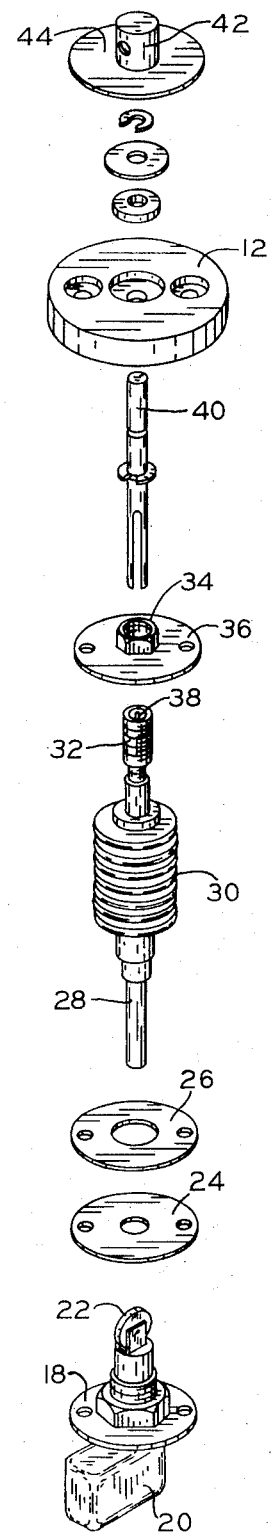
FIGS. 4 and 5 are exploded in somewhat schematic perspective views of the modifications of FIGS. 1 and 2, respectively.
Figure 5:
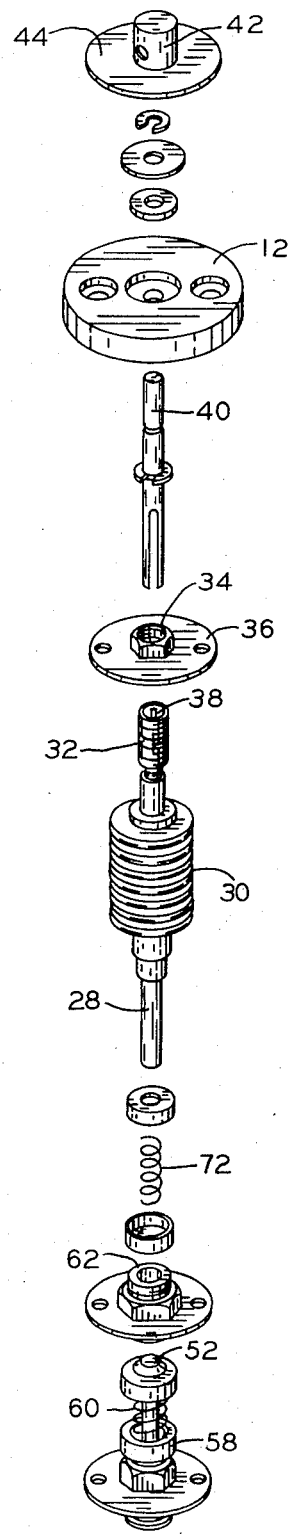

Referring to the drawings somewhat more in detail, the arrangement of FIG. 1 comprises a casing 10 having a cover member 12 attached thereto. Connected to cover member 12 are elongated threaded bolts 14 and 16. The bolts 14 and 16 are availed of for adjustably supporting a first plate 18 to which is adjustably connected a limit switch 20 having an actuating roller 22.

Support plates 24 and 26 are also mounted on the bolts and laterally guide a plunger 28 connected to one end of a bellows element 30, the other end of which is connected to the threaded spindle 32 threaded through a nut 34 mounted on a still further plate 36 carried on the bolts 14 and 16. Element 32 is connected by pin 38 to a slotted rod 40 extending through cover 12 and having a knob 42 thereon with a dial 44. The dial has indicia thereon cooperating with an index marker 46 stationary on cover 12.

In the bottom wall of housing 10 there is a bushing 48 through which connectors 50 extend for connection of limit switch 20 into an electric signalling circuit external of the illustrated instrument.

In operation, the bellows element 30 will expand as the altitude of the plane increases until plunger 28 engages actuating roller 22 of the limit switch 20 and will, at a certain altitude, actuate the limit switch and thereby effect a change in the electric circuit connected to connectors 50. Similarly, when the bellows 30 contracts, the switch 20 will again be actuated because plunger 28 will retract from actuating roller 22. The exact altitude at which the limit switch 20 will be actuated is adjustable by rotation of knob 42 and dial 44 to a predetermined rotated position as determined by the indicia on dial 44 and the marker 46. The nuts on the threaded bolts 14 and 16 disposed on opposite sides of the several plates 18, 24, 26 and 36 referred to, provide for factory adjustment of the instrument and for adjustment thereof during maintenance so that the altitude at which a signal is provided by the instrument by way of actuation of limit switch 20 can be adjusted.

Figure 2:
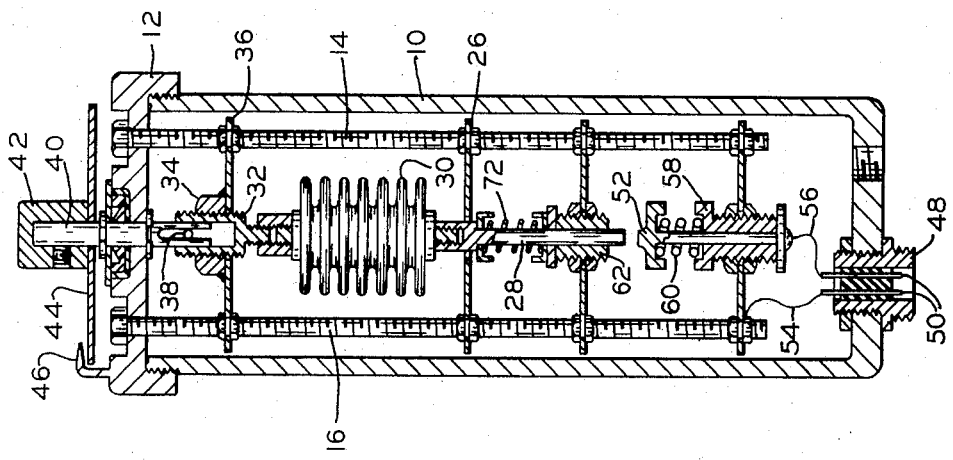
FIG. 2 is a sectional view through a modified form of the instrument which is similar to FIG. 1, except the barometric element directly actuates electrical contacts.

The modification of FIG. 2 is the same at that of FIG. 1, except that instead of the plunger 28 connected to the end of the bellows 30 actuating a limit switch, it actuates a resiliently supported contact element 52.

In order to form an electric circuit one of the connecting elements 50 is connected to bolt 16 by a wire 54, while the other is connected by a wire 56 with the contact element 52. Contact element 52 is reciprocably supported in a bushing 58 of electrical insulating material and biased toward plunger 28 by a spring 60. Plunger 28 is slidably guided in a bushing 62 of electrically conductive material so that as soon as plunger 28 engages contact 52, an electrical circuit will be completed between connectors 50. Alternatively, the circuit can be completed through bolt 16 and the plate 36 at the upper end of the bellows element and then back through the bellows element and then to the plunger 28. In any case, the contacts are directly closed by expansion of the bellows 30 and are opened by collapsing of the bellows.

Figure 3:
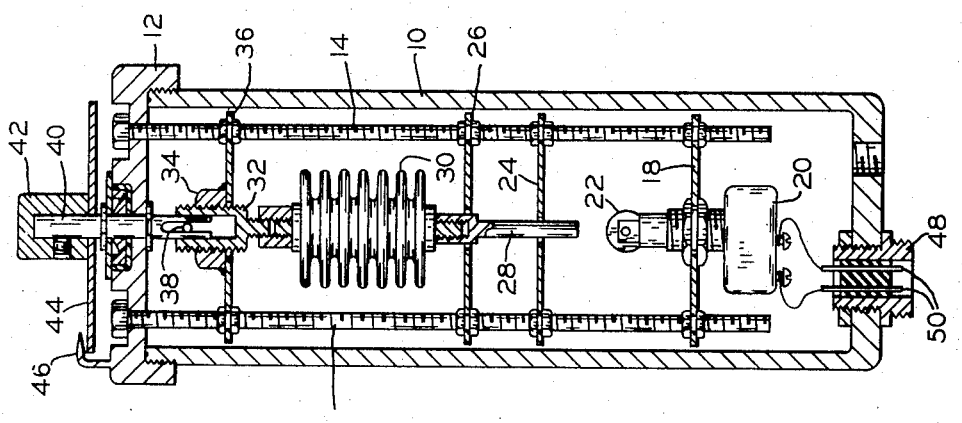
FIG. 3 is a longitudinal section through still another modification in which the barometric element directly actuates electrical contacts.

In the modification of FIG. 3, the same arrangement is illustrated except that the plunger which is connected to the bellows, and which is indicated at 63 in FIG. 3 is elongated and at the bottom carries a contact plate 64 which is opposed to a resiliently supported contact 66 reciprocable in electrical insulating bushing 68 and biased in the downward direction by a spring 70. The electric circuit inside the housing of the instrument connected to the connectors 50 is, in the case of the modification of FIG. 3, interrupted when the bellows 30 expands and is established when the bellows contracts. In all of the modifications of FIGS. 1 to 3, and which bear the same reference numerals where applicable, all of the individual parts are adjustable relative to each other to provide for adjustment of the instrument at the factory, or during overhaul, while the bellows element is bodily adjustable in the axial direction by availing of the external knob and dial in order to adjust the actual altitude at which the current controlling device either in the form of a limit switch or in the form of contacts open and close.

It will be noted, in the modifications of FIGS. 2 and 3, that the expanding movement of the bellows is resisted by a further compression spring 72 of which one end engages the bottom of the bellows element, while at the other end the spring is supported on the axially adjustable guide bushing. The sensitivity of the instrument can be controlled by adjustment of the guide bushing in order to vary the bias of spring 72 on the lower end of the bellows element.

Figure 6:
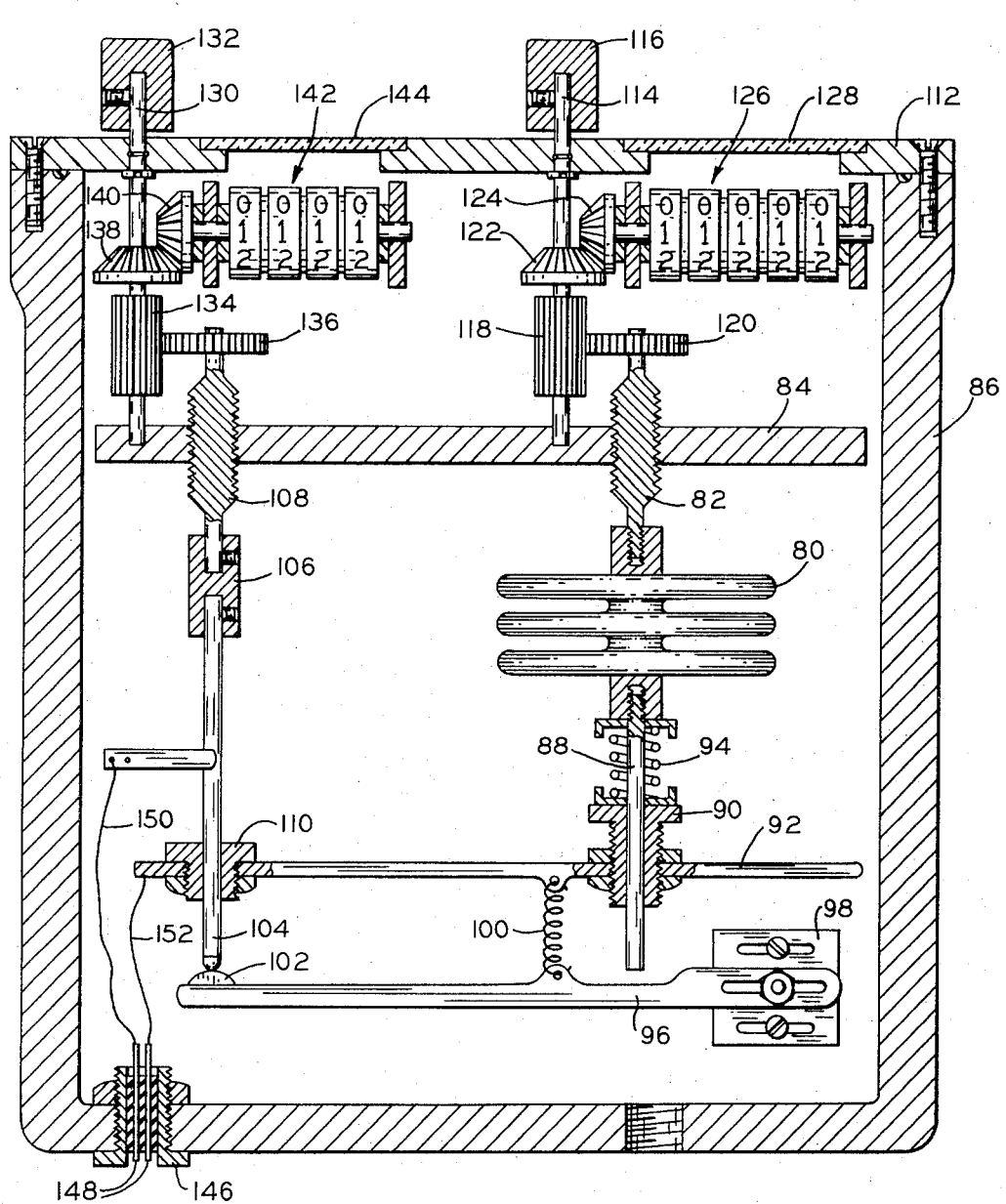
FIG. 6 is a longitudinal section through a modification in which a set of contacts are opened at a predetermined higher altitude and permitted to close below that altitude.

In FIG. 6, a bellows element 80 is provided having one end connected to a threaded spindle 82 which is threaded through a support member 84 fixedly mounted in housing 86. The other end of bellows 80 has a plunger 88 connected thereto and extending through a bushing 90 threaded into another support plate 92 fixedly arranged in housing 86. A spring 94 is provided having one end bearing upwardly beneath the lower end of bellows 80 and the other end bearing downwardly on the upper end of bushing 90.

A lever arm 96 is pivotally mounted in the housing as by the adjustable pivot means 98 and is spring urged in one direction by tension spring 100 connected between plate 92 and arm 96.

One end of arm 96 carries a contact element 102 which is arranged in opposed relation to a further contact element 104 in the form of a rod which, at the upper end, is connected by a block of electrical insulating material 106 with a further threaded spindle 108 which is also threaded in the support plate 84. The plunger 104 is guided in support plate 92 by a bushing 110, also of electrical insulating material.

Housing 86 has a cover member 112 thereon and extending through the cover member is a first shaft 114 having an actuating knob 116 and inside the cover is provided with elongated pinion 118 that meshes with the gear 120 connected to the threaded spindle 82. The shaft 114 also carries a bevel gear 122 that meshes with another bevel gear 124 on the shaft of a counter, generally indicated at 126, and visible through sight glass 128 in cover 112.

Similarly, another shaft 130 extends through cover 112 and carries a knob 132. Inside the housing, shaft 130 carries elongated pinion 134 meshing with a gear 136 on spindle 108, while a bevel gear 138 is also mounted on shaft 130 and meshes with a bevel gear 140 on the input shaft of a second counter, generally indicated at 142, and visible through a second sight glass 144 in cover 112.

In the other wall of the housing, is a bushing 146 through which connectors 148 extend and one of which connectors is electrically connected with contact 104 as by way of wire 150, while the other is connected with plate 92 as by way of wire 152, the said plate 92 being continuously electrically connected with contact 102 by way of bar 96 and at least spring 100.

Figure 7:
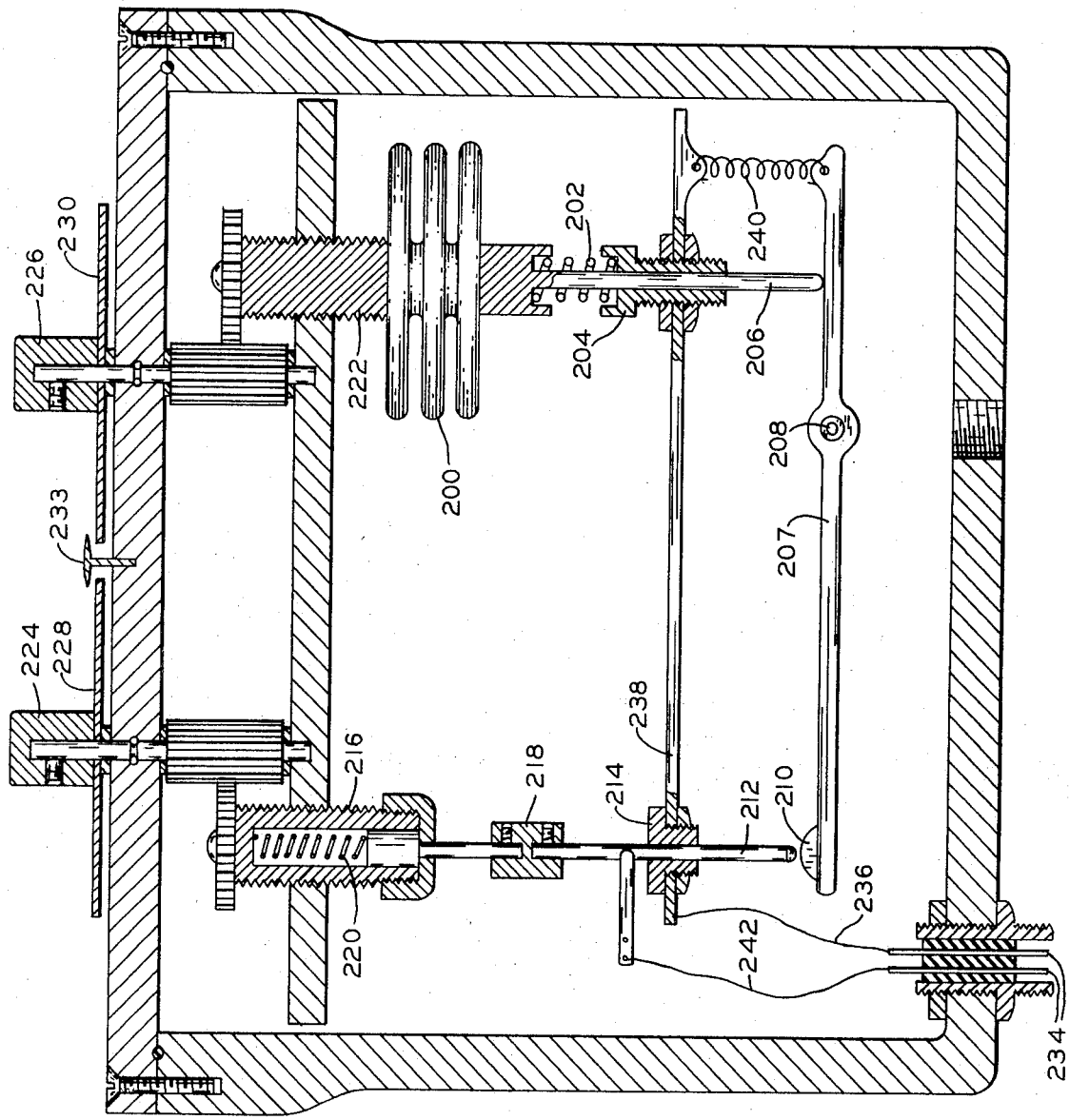
FIG. 7 is a section through an instrument similar to that of FIG. 6 but wherein the contacts close at a higher altitude and open below that altitude.

FIG. 7 shows an arrangement quite similar to that of FIG. 6, except that in FIG. 7 the bellows element 200, which is adjustably continuously restrained by spring 202 which seats on adjustable bushing 204, actuates a plunger 206 that engages arm 207 on the opposite side of the pivotal support 208 therefor from contact 210. Contact 210 is opposed to contact member 212 slidable in the insulating bushing 214 and connected to the threaded spindle 216 by an insulating coupling 218. Whereas, in FIG. 6, the contacts 102 and 104 close upon contraction of bellows 80, in FIG. 7 contacts 210 and 212 close upon expansion of the bellows. The contact member 212 in FIG. 7, is resiliently supported in spindle 216 and is biased downwardly by a spring 220 so that the member 212 will yield after the contacts close if the bellows element continues to expand.

In FIG. 7, the stationary end of the bellows is connected to a spindle 222 threaded in the frame. The spindles are adjustable by respective knobs 224 and 226, each of which has connected thereto a respective dial 228, 230 having graduations thereon which will register with the stationary pointer means 233 carried on the cover that is mounted on the housing of the device.

As in the previous modification, connector elements 234 extend into the housing at the bottom and one is connected by wire 236 with support plate 238 which is an electrical communication with arm 207 as by spring 240 which biases the arm in contact opening direction, while the other connector is connected by wire 242 with moveable contact member 212 which is otherwise electrically isolated from all parts of the instrument.

Figure 8:
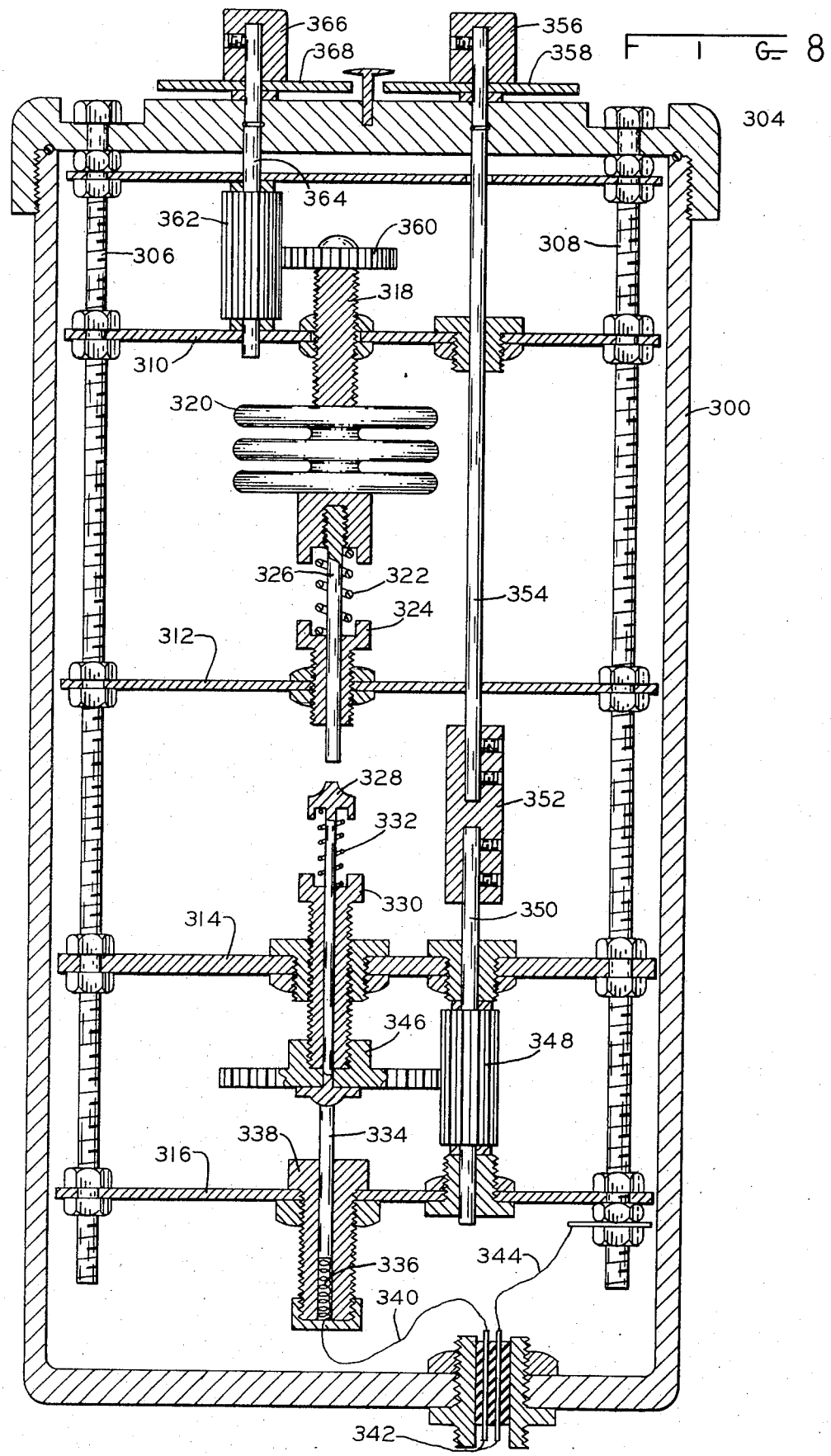
FIG. 8 is a longitudinal section through a modification in which a pair of contacts are closed in response to the aircraft reaching a predetermined altitude, and which contacts are opened below the aforementioned altitude.

FIG. 8 shows an arrangement having a housing 300 with a cover 304 carried thereon and connected to the cover are bolts 306 and 308. Adjustably mounted on bolts 306 and 308 as between clamp nuts are plates 310, 312, 314 and 316. Plate 310 threadedly receives spindle 318 which is connected to one end of a barometric element in the form of a bellows 320. The other end of the bellows 320 is adjustably restrained by spring 322, which has one end engaging the bellows and the other end bearing on a bushing 324, adjustable in plate 312. The bushing 324 has reciprocable therein a plunger 326 connected to the bellows and forming a contact element which is opposed to another contact element 328 which is slidable in a bushing 330 of electrical insulating material while being biased upwardly toward plunger 326 by spring 33. Bushing 330 is threaded in plate 314 for adjustment of the stationary contact. Bushing 330 may be of electrical insulating material, as mentioned, but it is also possible to make plate 314 of electrical insulating material in order to electrically isolate contact member 328.

At its extreme lower end, contact member 328 engages an electrically conductive plunger 334, spring biased upwardly by a spring 336 which is reciprocable in a bushing 338 of electrical insulating material carried by plate 316. A wire 340 serves electrically to connect plunger 334 with one of the connectors 342 extending into the bottom of the housing. The other of connectors 342 is connected by a wire 344 with bolt 308 which, in turn, is electrically connected to bellows 320 and therethrough with plunger 326.

A gear 346, preferably of electrically insulating material, is connected with bushing 330 and is engaged by a pinion 348 on a shaft 350 connected by the insulating coupling 352 with another shaft 354 which extends through cover 304 and is connected with a knob 356 having a dial 358 pertaining thereto.

Similarly, spindle 318 has a gear 360 thereon meshing with a pinion 362 on a shaft 364 extending through cover 304 and having a knob 366 connected thereto to which is attached a dial 368.

In the arrangement of FIG. 8, expansion of the bellows element will bring the contact members 326 and 328 together and collapsing thereof will separate the contact members. The contact members are electrically isolated from each other and thereby are operable upon closing and opening to control the circuit to which wires 340 and 344 are connected. All elements in the structure are fully adjustable and can be preset for any desired conditions and the stationary contact element 328 is fully adjustable in the direction of expansion and contraction of the bellows 320.

Figure 9:
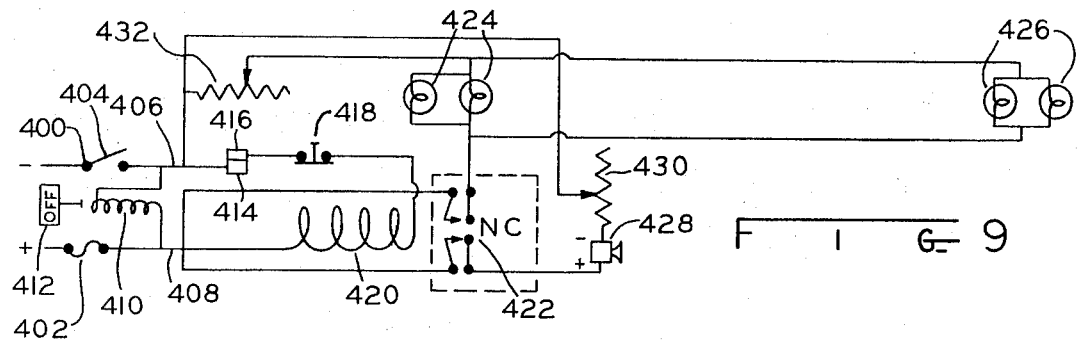
FIG. 9 is a schematic representation of an electric circuit employed with any of the modifications in which the contacts controlled by the barometric element are normally closed.

FIG. 9 schematically illustrates an electric circuit pertaining to any of the devices in which the contact elements are normally closed and which open under predetermined pressure conditions ambient to the barometric element.

In FIG. 9, wire 406 is connected to one contact 414 of the contacts controlled by the barometric element, the other of which is indicated at 416. Contact 416 is connected with one end of a relay coil 420, the other end of which is connected to wire 408. It will be apparent that with contacts 414, 416 closed coil 420 will be energized and this will normally hold the double set of relay blades generally indicated at 422 and pertaining to coil 420 open. However, opening of contacts 414 and 416 will deenergize coil 420 and permit the contacts 422 to close.

Blades 422 are connected in circuit with the paralleled signal lamps 424, which may be at the pilot's position, and the paralleled signal lamps 426 which may be at the co-pilot's position, and with an audible signalling device 428. A rheostat 430 can be adjusted to control the amount of power supplied to audible signalling device 428 and a further rheostat 432 can be provided to control the amount of power supplied to both pilots' lamps 424 and 426.

In operation, whenever contacts 414, 416 open the relay contacts 422 will drop closed thereby energizing the signal lamps and the audible signalling device.

Figure 10:
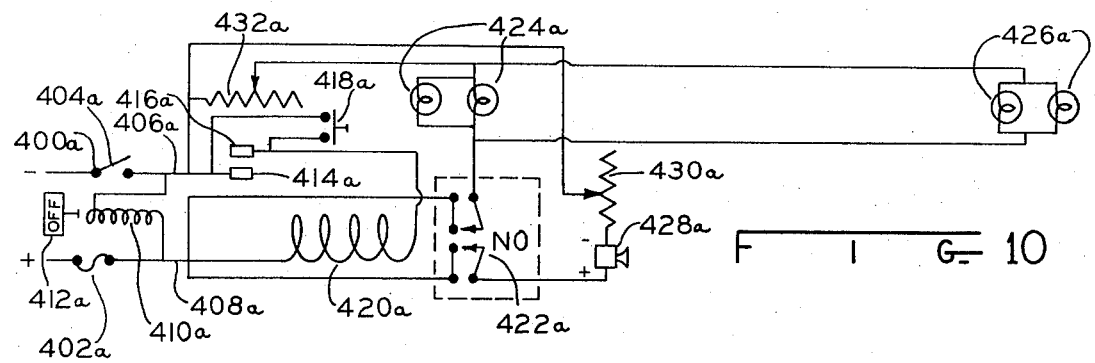
FIG. 10 is a schematic representation of an electric circuit in which the contacts actuated by the barometric element are normally open.

In FIG. 10, a circuit is shown which is similar to that of FIG. 9, and the same reference numerals are employed where applicable with the addition of subscript "a." In FIG. 10, the contacts 414a and 416a are normally open. The coil 420a pertaining to the relay blades 422a is normally deenergized and the relay blades 422a are normally open. However, upon closing of the contacts 414a and 416a coil 420a is energized and contacts 422a will close, thereby energizing signal lamps 424a and 426a and the audible signalling device 428a. In all other respects the circuit of FIG. 10 is the same as that of FIG. 9.

Figure 11:
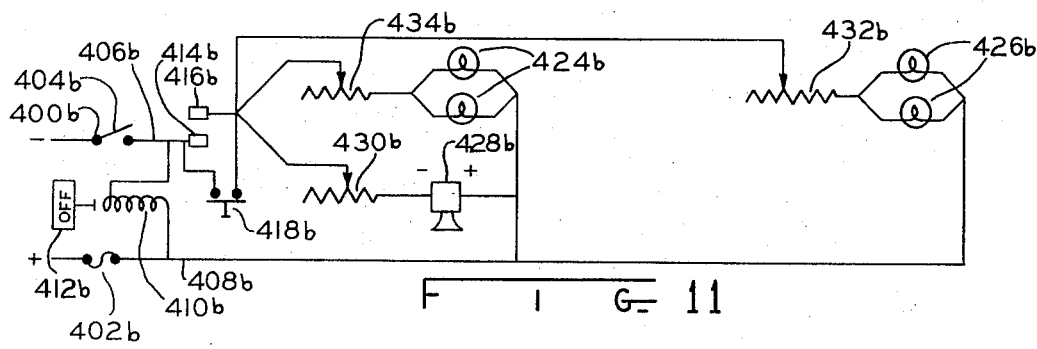
FIG. 11 is a modification of the circuit of FIG. 10.

The circuit of FIG. 11 is quite similar to that of FIG. 10, and bears the same reference numerals with the addition of a subscript "b." The difference in the FIG. 11 circuit is that the relay and its contacts are eliminated and the signal lamps and audible signalling device are operated directly by the opening and closing of contacts 414b and 416b.

Figure 12:
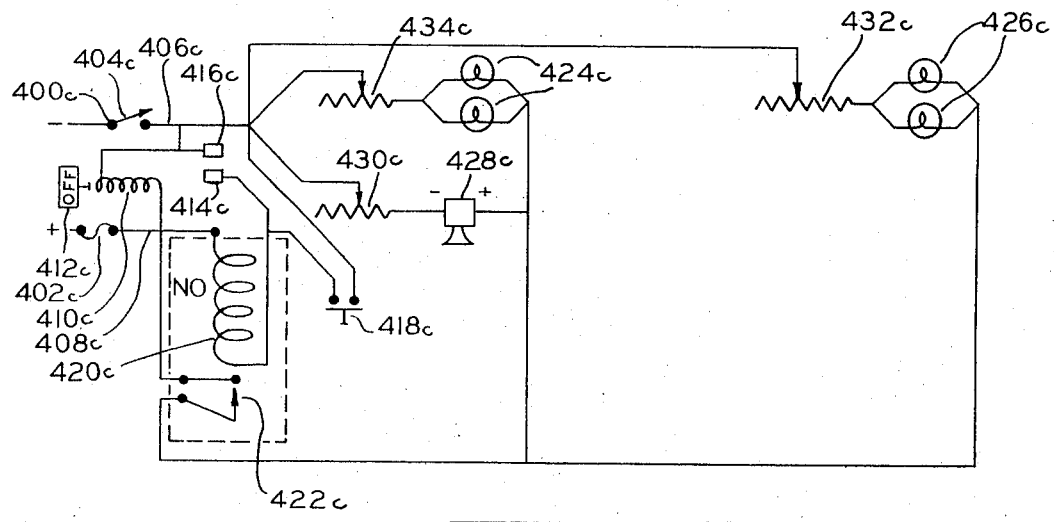
FIG. 12 is a further modification of the circuit of FIG. 10.

The circuit of FIG. 12 is substantially the same as that of FIG. 10, and has the same reference numerals applied thereto, where applicable, with the addition of a subscript "c." In FIG. 12, however, the relay coil 420c has associated therewith a single relay blade 422c which controls the energization of the signal lamps 424c and 426c and the energization of the audible signalling device 428c. Further, in FIG. 12, an individual control rheostat 432c is provided for lamps 426c and an individual rheostat 434c for lamps 424c. In all other respects the circuit of FIG. 12 is the same as that of FIG. 10.

Figure 13:
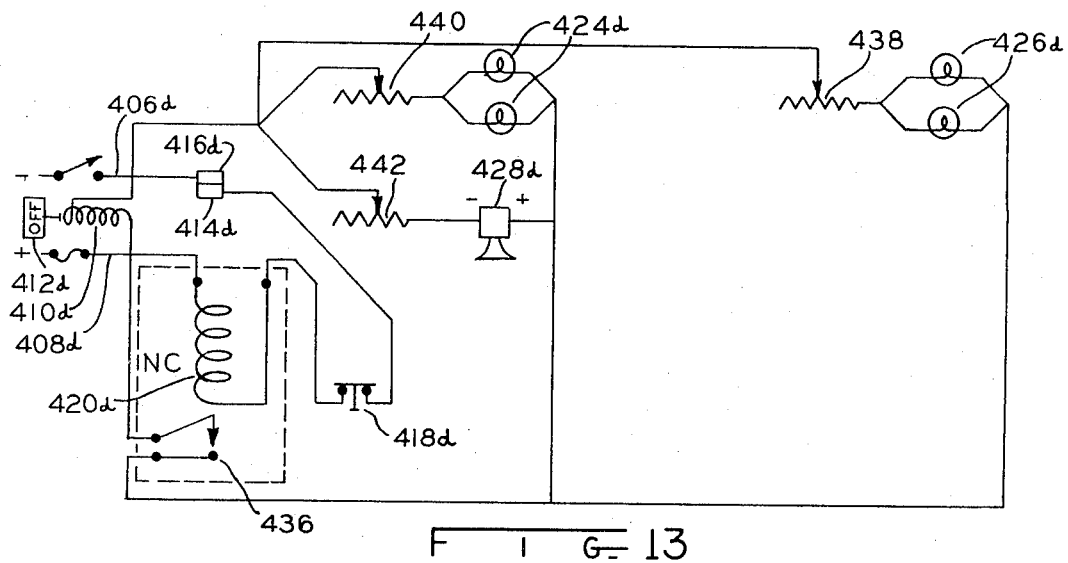
FIG. 13 is a modification of the circuit of FIG. 9.

FIG. 13 is a circuit like that of FIG. 9 and has the same reference numerals where applicable, with the addition of the subscript "d." In FIG. 13, however, relay coil 420d controls a single blade 436 that controls a supply of energy to signal lamps 424d and 426d and to the audible signalling device 428d. Individual current controlling rheostats 438 and 440 and 442 are connected in circuit with lamps 426d and 424d and signalling device 428d, respectively. Contacts 414d and 416d are normally closed and relay coil 420d is normally energized and the blade 436 pertaining thereto is normally closed and is held open while the relay coil is energized.

Figure 14:
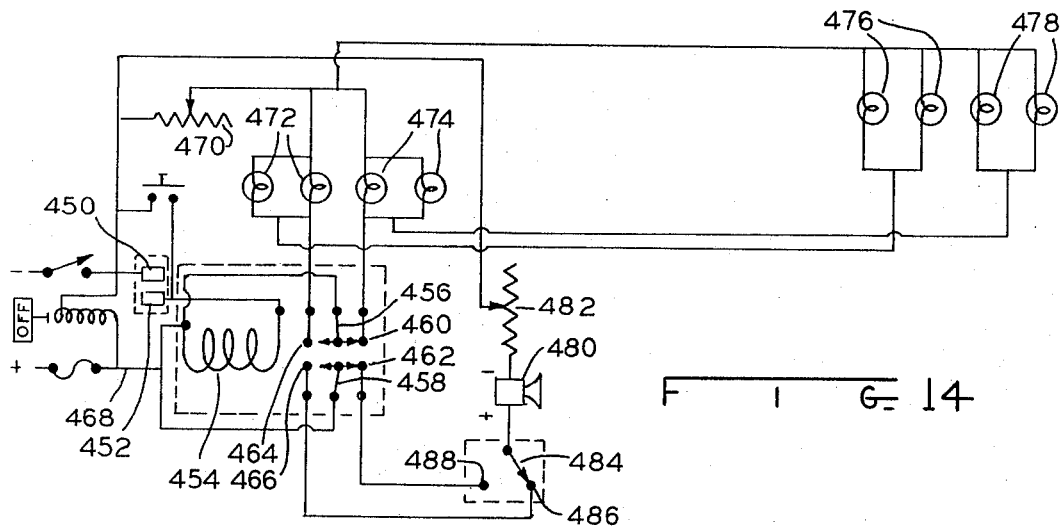
FIG. 14 is a further modification utilizing a flip flop circuit.

FIG. 14 shows a modified circuit arrangement in which the contacts 450 and 452 are controlled by the barometric element are normally open and control the energization of a relay coil 454 which controls a pair of blades 456 and 458 so that in deenergized condition of the coil blade 456 rests on contact 460 and blade 458 rests on contact 462, whereas in energized condition of coil 454 blade 456 rests on contact 464 and blade 458 rests on contact 466. Both of blades 456 and 458 are connected to wire 468 leading to one side of a source of electric power.

The other side of the source of power is connected through a rheostat 470 with one side of the signal lamps 472 and 474 for the pilot's position and the lamps 476 and 478 for the copilot's position. The other side of lamps 472 and 476 is connected to contact 464 and the other side of lamps 474 and 478 is connected to contact 460.

Audible signalling device 480 has one side connected with one side of the source of electric power via a rheostat 482 and the other side connected to a switch blade 484 closeable on contact 486 or 488. Contact 486 is connected to contact 466 and contact 488 is connected to contact 462.

In operation, with the circuit of FIG. 14 in the condition shown, lamps 474 and 478 (which may be green) are illuminated. When the plane reaches a certain preset altitude, 17,500 feet, for example, contacts 450 and 452 will be closed, coil 454 will be energized and blades 456 and 458 will leave contacts 460 and 462 and will, instead, engage contacts 464 and 466. Lamps 474 and 478 will go dark and lamps 472 and 476 (which may be red) will become illuminated while simultaneously signal 480 will sound. This will alert the pilot to adjust the altimeter. Upon actuating blade 484, which could be pushbutton controlled, the audible signal 480 will go silent.

The plane upon descending through the present altitude will cause the lamps to again change and signal 480 will sound thus alerting the pilot again to the need for adjustment of the altimeter and when this is done, switch blade 484 will be manually switched from contact 488 back to contact 486 so as to silence aural signal 480 and this actuation also arms aural signal 480 so that activation will occur if accent intrusion should occur up thru the 17,500 foot level.

Figure 15:
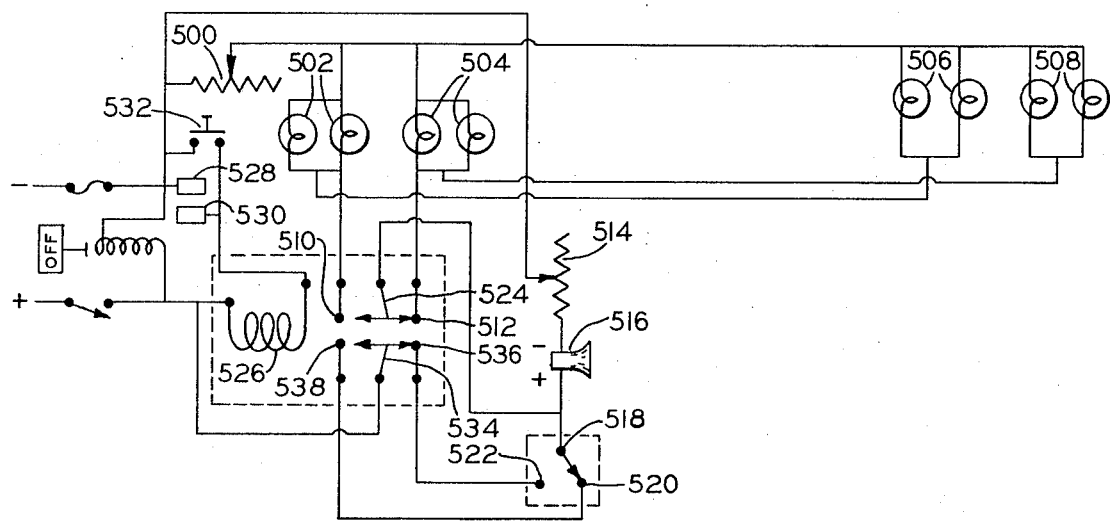
FIG. 15 is another modification of the circuit of FIG. 14.

FIG. 15 shows a modification of FIG. 14, the only difference being the routing of the visual light return current thru the manual push button silencing rearming switch along with the aural signal, therefore both the visual and the aural will respond in an identical manner both of which will cancel and rearm simultaneously.

In operation of FIG. 15, as the aircraft ascends up thru 17,500 foot, contacts 528 and 530 make resulting in energizing coil 526 attracting blades 524 and 534 thereby breaking contact with 512 and 536 and making contact with 510 and 538 respectively which now results in illumination of visual light signals 502 and 506 the return current of which is now routed thru switch blade 518 contacting 520. Also simultaneously activated is aural signal 516 which is co-routed with visual signal thru blade 518 contacting 520. In response to both visual and aural signals, the pilot now sets his altimeter to 29.92 STANDARD then the pilot manually actuates switch blade 518 so as to break away from contact 520 and make contact with 522 which results in simultaneous cancelation of visual and aural signals being a total reward to the pilot instead of half reward as accomplished by FIG. 14. Rearming of the system for intrusion warning of altitudes below 17,500 foot occurs simultaneously with the prior cancelation.

Thereafter, when the plane descends through the same aforementioned altitude, contacts 528 and 530 will open and deenergize coil 526 and blades 524 and 534 will return to engagement with contacts 512 and 536. At this time, due to the position of blade 518 in engagement with contact 522, the audible signalling device will again sound while lamps 504 and 508 will become illuminated and which lamps may, for example, be green. After the required adjustment of the altimeter is made at this time, the blade 518 can be returned to engagement with contact 520 and all of the lamps and signalling devices will again be deenergized.

The ascent circuit consists of a conductor to contacts 528 and 530 and coil 526 which attracts blades 524 and 534 thereby completing the ascent circuit through contacts 510 and 538 and illuminating signals 502 and 506. For the descent circuit, while the plane is descending, contacts 512 and 536 are as shown in FIG. 15 and blade 518 is in contact with contact 522. Lamps 504 and 508 are then illuminated through the closed contacts 512 and 536.

Figure 16:
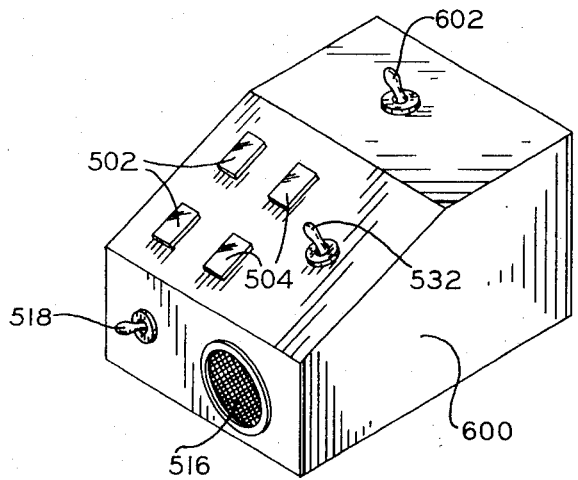
FIG. 16 is a perspective view, showing a unit containing the control switches and the signalling devices of the instrument.

FIG. 16 shows one form which the part of the instrument containing the signal devices and switches might take. In FIG. 16, a housing 600 is provided and the elements mounted therein are identified by the same reference numerals as are employed in FIG. 15. This instrument, which is at the pilot's position, has lamps 502 and 504 and the audible signalling device 516 mounted therein. An ON-OFF switch 602 can be provided and the test switch 532 and the reward switch indicated at 518 is also mounted in the housing 600 of the unit.

The circuit of FIG. 16 is of particular merit in that total reward is provided for the pilot because once the audible signal sounds and either of the lamps are lighted, preadjustment of switch 518 will cause the audible signal to go silent and the lamps to go dark regardless of which ones thereof were illuminated at the time of the sounding of the audible signal.

Although the present invention has been illustrated and described in connection with a few selected example embodiments it will be understood that these are illustrative of the invention and are by no means restrictive thereof. It is reasonably to be expected that those skilled in this art can make numerous revisions and adaptations and it is intended that such revisions and adaptations will be included within the scope of the following claims.

What is claimed is:

1. In a barometric instrument:
   a control circuit and signal means responsive to said control circuit as the pilot either ascends or descends through a predetermined altitude, said control circuit comprising an ascent circuit and a descent circuit, a manual combination arming and disarming switch having a first position wherein the ascent circuit is armed and the descent circuit is disarmed and a second position wherein the descent circuit is armed and the ascent circuit is disarmed,
   a pressure responsive element having adjustment means making such pressure responsive element energizable at a predetermined altitude,
   a switch operated by said pressure responsive element,
   and a relay switch responsive to said pressure responsive element operated switch to a first position for connecting a power source to said signalling means through said manually controlled switch and said ascent circuit as the plane is ascending through the predetermined altitude, said manually operated switch being effective in its second position for simultaneously disarming the ascent circuit and arming the descent circuit as the aircraft ascends through a predetermined altitude to deactivate the signalling means, said pressure responsive operated switch being operable as the aircraft descends through the predetermined altitude to again energize said signalling means through said descent circuit by operation of said relay controlled switch means.

2. A barometric instrument according to claim 1 in which said current control means comprises at least one pair of contacts which are closed in said first condition of said current control means and open in said second condition thereof, first means in said frame stationarily supporting one of said contacts, and second means operatively connecting the other of said contacts to said element for movement thereby in contact closing and contact opening direction.

3. A barometric instrument according to claim 2 in which said first means includes threaded means supporting said one contact in said frame and adjustable for moving said one contact in the same direction in which the other contact is moveable by said element, said adjustable means comprising an adjusting member connected to said threaded means for effecting said adjustment thereof from externally of said frame.

4. A barometric instrument according to claim 2 in which said element is a bellows, threaded means supporting one end of said bellows in said frame and adjustable for adjusting the axial position of said bellows in said frame, said second means operatively connecting the other end of said bellows to said other contact, said adjustable means comprising an adjusting member, and means operable from externally of said frame and connected to said adjustable means for effecting said adjustment thereof.

5. A barometric instrument according to claim 4 which includes resilient means between said frame and the said other end of said bellows.

6. A barometric instrument according to claim 2 in which said first means includes first threaded means supporting said one contact in said frame, and adjustable for moving said one contact in the same direction in which the other contact is moveable by said element, said adjustable means comprising a first adjusting member connected to said first threaded means for effecting said adjustment thereof from externally of said frame, said element comprising a bellows, second threaded means supporting one end of said bellows in said frame and adjustable for adjusting the axial position of said bellows in said frame, said second means operatively connecting the other end of said bellows to said other contact, said adjustable means comprising a second adjusting member, and means operable from externally of said frame and connected to said second adjustable means for effecting said adjustment thereof.

7. A barometric instrument according to claim 2 which includes a lever pivotally mounted at a first point therealong in said frame, said other contact being mounted on a second point along said lever, said element comprising a bellows having one end connected to said frame, and means for operatively engaging the other end of said bellows with a third point along said lever.

8. A barometric instrument according to claim 7 which includes resilient means between said frame and the other end of said bellows, and said adjustable means comprising means connected to said one end of said bellows and actuatable from externally of said frame for moving said one end of said bellows in the axial direction of the bellows.

9. A barometric instrument according to claim 7 in which said adjusting means includes threaded means connected to said one contact and actuatable from externally of said frame for moving said one contact in the direction toward and away from said other contact.

10. A barometric instrument according to claim 1 in which said signal means comprise visible signal means and audible signal means.

11. A barometric instrument according to claim 10 in which said circuit means includes manual switch means adjustable for interrupting the supply of energy to at least said audible signal means.

12. A barometric instrument according to claim 10 in which said circuit means includes electrically operable switch means having two positions with a respective one thereof corresponding to each condition of said current control means, and manual switch means in said circuit means having first and second positions, each of which permits a supply of energy to said audible signal means in a respective one only of the positions of said electrically operable switch means.

13. A barometric instrument according to claim 12 in which said visible signal means comprises first and second lamp means, said electrically operable switch means effecting energization of a respective one only of said first and second lamp means in each position thereof.

14. A barometric instrument according to claim 13 in which said manual switch means permits a supply of energy to a respective one only of said first and second lamp means in each position thereof.

15. A barometric instrument according to claim 10 in which said visible means comprises first and second lamp means, said circuit means including a two position electrically operable switch means having two blades and two contacts with each blade engaging a respective contact in each switch position, each said lamp means being connected on one side to one side of a source of electrical energy and on the other side to a respective contact pertaining to one of said blades, said audible signal means having one side connected to said one side of said source and the other side connected to said one blade, the other of said blades being connected to the other side of said source, and a two position manual switch operable in each position to connect said one blade to a respective one only of the contacts pertaining to said other blade.

16. A barometric instrument according to claim 10 which includes means adjustable for controlling the amount of energy supplied to said signal means.

17. A barometric instrument according to claim 10 in which both the visible signal means and audible signal means are responsive simultaneously and jointly to said current control means.

18. A barometric instrument according to claim 1 which includes test switch means connected in parallel with said current control means.

19. A barometric instrument according to claim 1 which includes manually operable test switch means in circuit with said current control means and operable upon actuation to control said circuit means in the same manner as when said current control means is actuated, thereby providing means for testing said circuit means.

20. A barometric instrument according to claim 19 in which said current control means is normally in nonconductive condition and goes to conductive condition when actuated and said test switch means is a normally open switch connected in parallel with said current control means.

21. A barometric instrument according to claim 19 in which said current control means is normally in conductive condition and goes to nonconductive condition when actuated and said test switch means is a normally closed switch connected in series with said current control means.

22. In a barometric instrument; electrically operable lamp means and audible means, a barometric element sensitive to a predetermined pressure for establishing a supply of energy for said lamp means and said audible means, means for adjusting said barometric element to establish the predetermined pressure at which it establishes the supply of energy for said lamp means and said audible means, a manual switch operable for interrupting the supply of energy to at least said audible means, and a control circuit including signal means responsive to said control circuit as the pilot either ascends or descends through a predetermined altitude, said control circuit comprising an ascent circuit and a descent circuit, a manual combination arming and disarming switch having a first position wherein the ascent circuit is armed and the descent circuit is disarmed and a second position wherein the descent circuit is armed and the ascent circuit is disarmed.

23. A barometric instrument according to claim 22 in which said pressure corresponds to a predetermined lower altitude.

24. A barometric instrument according to claim 22 in which said pressure corresponds to a predetermined higher altitude.

25. The instrument in accordance with claim 22 wherein said predetermined pressure corresponds to a predetermined altitude and switch means which energizes one or both of said audible and lamp means to inform the occurrence of passage through said altitude during either ascent or descent relatively to said predetermined altitude.

* * * * *